(12) United States Patent
Rauch et al.

(10) Patent No.: US 6,178,031 B1
(45) Date of Patent: Jan. 23, 2001

(54) RASTER OUTPUT SCANNING SYSTEM HAVING SCAN LINE NON-LINEARITY COMPENSATION MEANS

(75) Inventors: Russell B. Rauch, Pasadena; Mohammad H. Rahnavard, Rancho Palos Verdes, both of CA (US)

(73) Assignee: Xerox Corporation, Stamford, CT (US)

(*) Notice: Under 35 U.S.C. 154(b), the term of this patent shall be extended for 0 days.

(21) Appl. No.: 09/467,568

(22) Filed: Dec. 20, 1999

(51) Int. Cl.[7] .................................................. G02B 26/08
(52) U.S. Cl. .......................... 359/216; 359/217; 347/255; 347/249
(58) Field of Search ................................. 359/212, 216, 359/219; 347/247–249, 255, 261

(56) References Cited

U.S. PATENT DOCUMENTS

| | | | |
|---|---|---|---|
| 4,860,237 | 8/1989 | Curry | 364/718 |
| 5,448,266 * | 9/1995 | Jamzadeh | 347/250 |
| 5,477,330 * | 12/1995 | Dorr | 347/249 |
| 5,822,105 * | 10/1998 | Kodama et al. | 359/216 |

* cited by examiner

Primary Examiner—James Phan
(74) Attorney, Agent, or Firm—William Propp

(57) ABSTRACT

The pixel clock of a raster output scanning (ROS) system modulates an emitted light beam to provide pixel placement along a scan line. A method calculates the pixel clock frequency shifts to correct non-linearity of the scan line in a ROS. A data smoothing polynomial is calculated for the non-linearity of the pixels along the scan line. The needed frequency shift based on the polynomial to the first or higher orders is calculated and stored in a frequency shift look-up table. The calculated frequency shift from the frequency shift lookup table modifies the nominal pixel clock frequency to correct for the measured scan linearity of the ROS by modulation of the light beam.

6 Claims, 6 Drawing Sheets

RASTER OUTPUT SCANNING SYSTEM HAVING SCAN LINE NON-LINEARITY COMPENSATION MEANS

BACKGROUND OF THE INVENTION

The present invention relates to scan line non-linearity in a Raster Output Scanning (ROS) system and, more particularly, to a method for calculating frequency shifts to correct the scan line non-linearity.

Printing systems utilizing lasers to reproduce information are well known in the art. The printer typically uses a Raster Output Scanner (ROS) to expose the charged portions of a photosensitive medium, such as a photoreceptor, to record an electrostatic latent image on the photosensitive medium.

A plurality of ROS units can be used in a color xerographic ROS printer. Each ROS forms a scan line for a separate color image on a common photoreceptor belt. Each color image is developed in overlying registration with the other color images from the other ROS units to form a composite color image which is transferred to an output sheet. Registration of each scan line of the plurality of ROS units requires each image to be registered to within a 0.1 mm circle or within a tolerance of ±0.05 mm.

A typical prior art raster output scanning system 10 of FIG. 1 includes a light source 12 for generating a light beam 14 and scanning means 16 for directing the light beam 14 to a spot 18 at a photosensitive medium 20. The scanning means 16 also serves to move the spot 18 along a scan line 22 of specified length at the photosensitive medium 20. For that purpose, the scanning means 16 in the illustrated scanner system 10 includes a rotatable polygon mirror with a plurality of light reflecting facets 24 (eight facets being illustrated) and other known mechanical components that are depicted in FIG. 1 by the polygon 16 rotating about a rotational axis 26 in the direction of an arrow 28.

The light source, 12, such as a laser diode, emits a modulated coherent light beam 14 of a single wavelength. The light beam 14 is modulated in conformance with the image information data stream contained in the video signal sent from image output light source control circuit 30 to the light source 12.

The modulated light beam 14 is collimated by a collimating lens 32, then focused by a cross-scan cylindrical lens 34 to form a line on a reflective facet 24 of the rotating polygon mirror 16.

The polygon mirror 16 is rotated around its axis of rotation by a conventional motor (not shown), known to those of ordinary skill in the art.

The beam 14 reflected from the facet 24 then passes through the f-theta scan lenses 36 and the anamorphic wobble correction lens 38.

The f-theta scan lens 36 consists of a negative plano-spherical lens 40, a positive piano-spherical lens 42, and the cross-scan cylinder lens 44. This configuration of f-theta scan lenses has sufficient negative distortion to produce a linear scan beam. The light beam will be deflected at a constant angular velocity from the rotating mirror which the f-theta scan lens optically modifies to scan the surface at a constant linear velocity.

The f-theta scan lens 36 will focus the light beam 14 in the scan plane onto the scan line 22 on the photosensitive medium 20.

After passing through the f-theta scan lens 36, the light beam 14 then passes through a wobble correction anamorphic lens element 38. The wobble correction optical element can be a lens or a mirror and is sometimes referred to as the "motion compensating optics". The purpose of optical element 38 is to correct wobble along the scan line generated by inaccuracies in the polygon mirror/motor assembly.

The wobble correction lens 38 focuses the light beam in the cross-scan plane onto the scan line 22 on the photosensitive medium 20.

As the polygon 16 rotates, the light beam 14 is reflected by the facets 24 through the f-theta and wobble correction lenses and scans across the surface of the photosensitive medium in a known manner along the scan line 22 from a first end 46 of the scan line 22 (Start of Scan or "SOS") past a center (the illustrated position of the spot 18) and on to a second end 48 of the scan line 22 (End of Scan or "EOS"). The light beam exposes an electrostatic latent image on the photosensitive member 20. As the polygon 16 rotates, the exposing light beam 14 is modulated by circuit 30 to produce individual bursts of light that expose a line of individual pixels, or spots 18, on the photosensitive member 20.

Ideally, the ROS should be capable of exposing a line of evenly spaced, identical pixels on the photosensitive medium 20. However, because of the inherent geometry of the optical system of the ROS, and because manufacturing errors can cause imperfections in the facets of a polygon mirror, obtaining evenly spaced, identical pixels can be problematic.

"Scan non-linearity" refers to variations in spot velocity occurring as the spot moves along the scan line during the scan cycle. Scan linearity is the measure of how equally spaced the spots are written in the scan direction across the entire scanline. Typical scan linearity curves start at zero position error at one end of a scan having a positive lobe of position error across the scanline, cross the center of scan with zero position error and then have a negative lobe of position error across the remainder of the scanline toward the other end of the scan. Scan linearity curves may have image placement errors of zero at several locations across the scanline. Ideally, the curve would be at zero across the entire scanline.

Scan non-linearity is typically caused by system geometry or a velocity variation of the scanning means. The speed at which the focussed exposing light beam travels across the scan line on the photosensitive medium 50 is called the spot velocity.

Without some means to correct for the inherent scan non-linearity caused by the geometry of the ROS system, the spot velocity will vary as the light beam scans across the photosensitive medium. A scanner having a multifaceted rotating polygon, for example, directs the light beam at a constant angular velocity. But the spot is farther from the polygon facets at the ends of the scan line than it is at the center and so the spot velocity will be higher towards the ends of the scan line, and lower towards the center of the scan line.

Some raster output scanners compensate for such non-linearity electronically using a variable frequency pixel clock (sometimes called a scanning clock). The pixel clock produces a pulse train (i.e., a pixel clock signal) that is used to turn the light beam emitted by the light source on and off at each pixel position along the scan line. Varying the clock frequency and thereby the timing of individual pulses in the pulse train serves to control pixel placement along the scan line. If the frequency of the pixel clock signal is constant, the resulting pixels will be positioned further apart at the edges of the photosensitive medium, and closer together towards the center of the photosensitive medium. That will more evenly space the pixels and thereby at least partially compensate for what is sometimes called pixel position distortion (i.e., uneven pixel spacing caused by scanner non-linearity).

The light source control circuitry 30 serves as an electronic control system for controlling the light beam 14 in order to produce the pixels along the scan line 22. The control system may, for example, be configured using known componentry and design techniques to produce a control signal for activating the light beam at each of a plurality of desired pixel positions along the scan line (e.g., the central portion of each pixel position being evenly spaced at 1/300 inch intervals for 300 dpi resolution or being evenly spaced at 1/600 inch intervals for 600 dpi resolution, etcetera).

Preferably, the control system is configured so that the control signal defines a pixel interval for each pixel position and so that the pixel interval defined by the control signal varies proportionately according to spot velocity, i.e., a higher frequency at the ends of the scan line than toward the center. For that purpose, the control system may synchronize the control signal with spot position by suitable known means, such as by responding to a start-of-scan (SOS) control signal or other synchronizing signal produced by known means, in order to vary the pixel interval according to spot velocity.

FIG. 2 shows a scan line 100 consisting of a series of pixels 102 uniformly spaced 104 by the pixel clock of the raster output scanning system. These pixels 102 on the scan line 100 are placed on a uniform grid 106 at each clock cycle to form the idealized, perfect scan non-linearity.

FIG. 3 illustrates deviation from the uniform pixel placement of FIG. 2 due to scan non-linearity. The scan line 200 consists of a series of pixels 202 which are displaced by a distance 204 from the uniform pixel placement 206 along the scan line as shown schematically in the graph of FIG. 4.

In practice, the raster output scanning system has a small non-linearity, which causes deviations from the uniform grid. This departure from uniform pixel placement along the scan line is called scan non-linearity. The shape of the non-linearity signature varies from ROS to ROS and can thus cause mis-registration between colors in a multiple ROS laser printer.

It is an object of the present invention to provide a method of calculating pixel clock frequency shifts to correct non-linearity of the scan line in a ROS.

SUMMARY OF THE INVENTION

According to the present invention, the pixel clock of a raster output scanning (ROS) system modulates an emitted light beam to provide pixel placement along a scan line. A method calculates the pixel clock frequency shifts to correct non-linearity of the scan line in a ROS.

A data smoothing polynomial is calculated for the non-linearity of the pixels along the scan line. The needed frequency shift based on the polynomial to the first or higher orders is calculated and stored in a frequency shift look-up table. The calculated frequency shift from the frequency shift lookup table modifies the nominal pixel clock frequency to correct for the measured scan linearity of the ROS by modulation of the light beam emitted by the light source.

Other objects and attainments together with a fuller understanding of the invention will become apparent and appreciated by referring to the following description and claims taken in conjunction with the accompanying drawings.

DESCRIPTION OF THE INVENTION

The pixel clock of the present invention has a nominal clock frequency of f0 to provide uniformly spaced pixel placement along the scan line by modulating the light beam emitted by the light source of the raster output scanning (ROS) system. Scan line non-linearity will cause uneven spacing of the pixels along the scan line. The present invention provides a method for calculating the necessary frequency shifts Δf based on the scan line non-linearity of the ROS to modify the nominal pixel clock frequency f0) to provide uniformly spaced pixel placement along the scan line.

The method of the present application corrects for scan non-linearity by (a) using actual ROS non-linearity data, (b) fitting a smooth curve to the data (while forcing the end point corrections to zero), (c) by calculating the correction frequency shift calculation to the first order, and (d) applying the calculated frequency shift as a small FM (frequency modulation) of the nominal pixel clock frequency to correct for the measured scan linearity.

First, the scan non-linearity profile of the ROS is measured. Second, a data smoothing polynomial, corresponding to the scan non-linearity, is calculated. The smoothing procedure includes forcing the polynomial to zero at the ends of active scan. Third, the needed frequency shift to correct the non-linearity is calculated to the first order and a frequency shift lookup table is created. Fourth, the calculated correction of the clock frequency from the frequency shift lookup table is applied to the light source control circuitry that generates the pixel clock frequency. The pixels will then be placed with equal spacing across the active scanline of the ROS by modulation of the light beam emitted by the light source in response to the shifted frequency from the pixel clock. The calculation method also allows correction of scan line offset and of scan magnification errors.

The first step in the present invention is to fit a polynomial curve to the data of uneven pixel placement along the scan line of the ROS by a technique such as least squares regression and to force the end points SOS and EOS to be zero by either weighting or by a piecewise polynomial fit.

The polynomial curve can be fitted to the data by other techniques such as Givens, Householder, and Cholesky.

Figure 1:
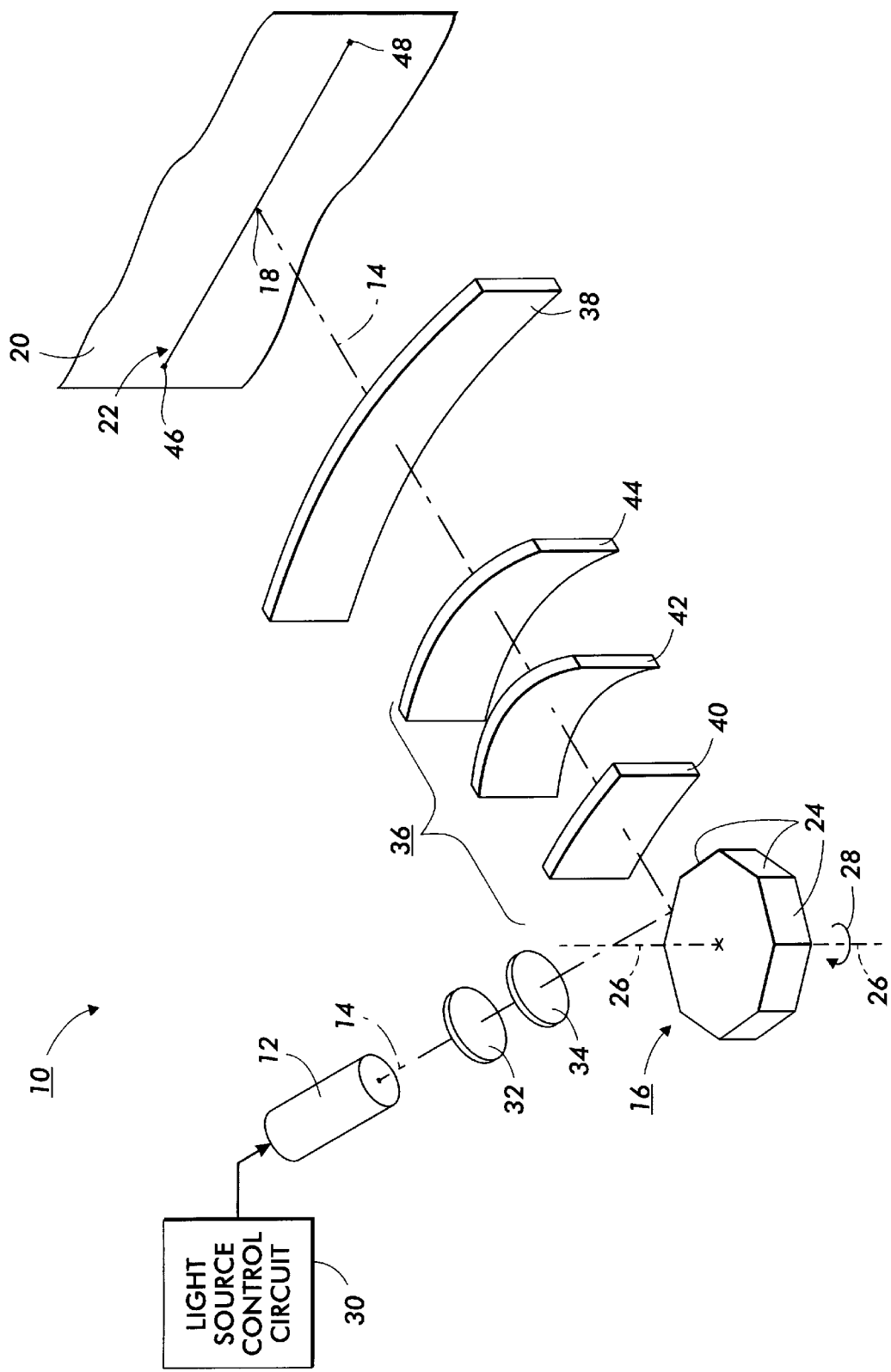
FIG. 1 illustrates a schematic side view of a prior art raster output scanning (ROS) system.
Figure 2:
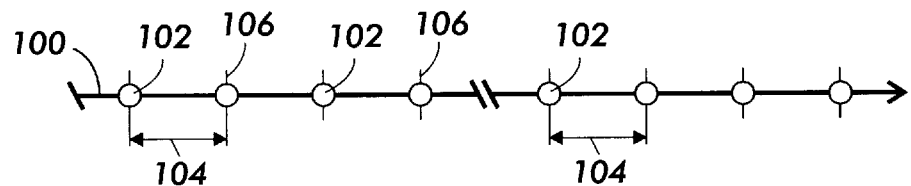
FIG. 2 is a side view of idealized pixel placement along a scan line.
Figure 3:
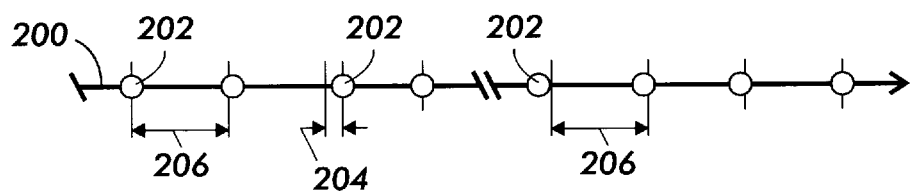
FIG. 3 is a side view of non-linear pixel placement along a scan line.
Figure 4:
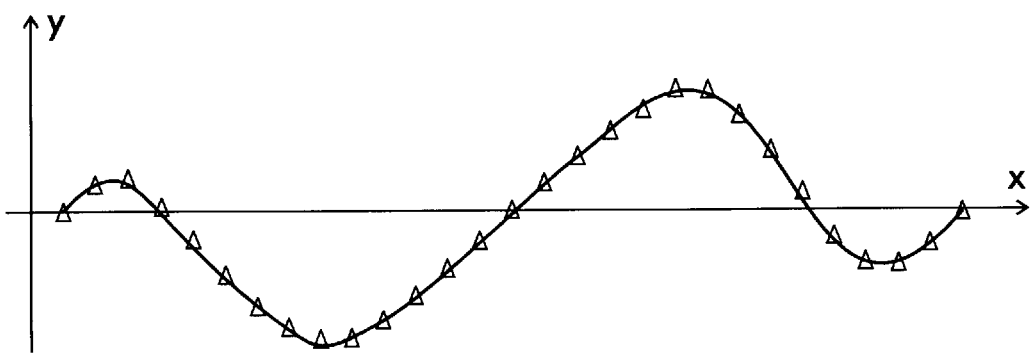
FIG. 4 is a graph measuring scan non-linearity of the pixel placement of FIG. 3.
Figure 5A:
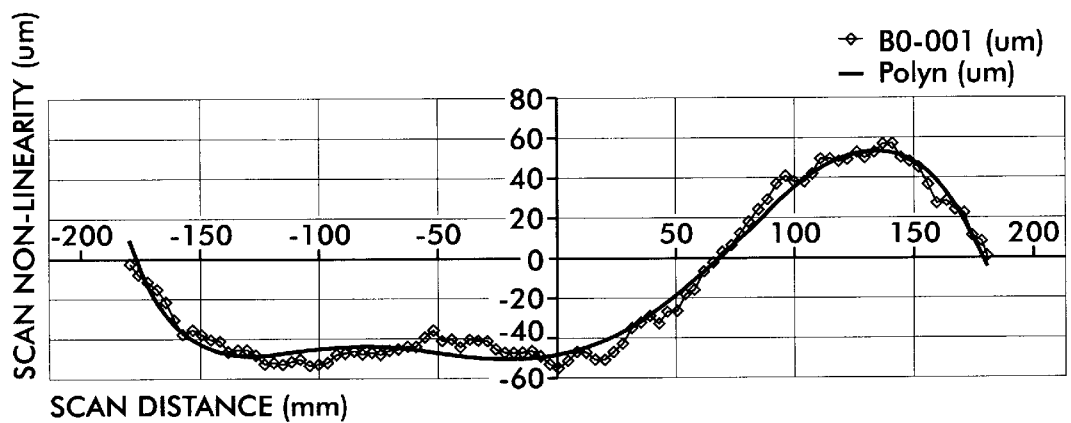
FIG. 5A is a graph illustrating a scan non-linearity curve for a first raster output scanning (ROS) system.
Figure 6A:
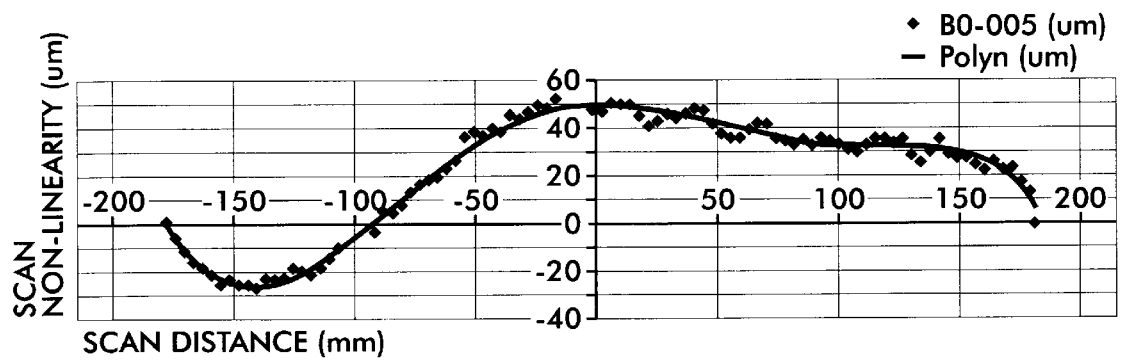
FIG. 6A is a graph illustrating a scan non-linearity curve for a second raster output scanning (ROS) system.

The graphs of FIGS. 5A and 6A are two typical scan non-linearity curves for two different ROS's. The scan non-linearity curves for the two ROS's are shaped differently and thus illustrate the ROS to ROS deviation.

The frequency shift $\Delta f$ (from the nominal clock frequency $f0$), which is corrected for the non-linearity, is calculated to the first order by:

$$\Delta f = f0 * dy/dx \quad \text{[Equation 1]}$$

where $dy/dx$ is the slope of the polynomial fit, calculated from the measured curve of scan linearity y versus scan distance x for the pixels along the scan line. A secondary advantage to the polynomial fit is the ability to take data with one size of sampling interval (sampling rate) and to utilize the data with a different sampling interval (sampling rate).

The average scan spot velocity $v0$ of the light beam across the active scanline is:

$$v0 = (xeoa - xsoa)/(Tsoa - Teoa) \quad \text{[Equation 2]}$$

where xsoa is the start position of active scan at SOS, xeoa is the end position of active scan at EOS, Tsoa is the start time of active scan at SOS and Teoa is the end-time of active scan at EOS. All times are measured from the SOS ("start of scan") ROS synchronization signal.

For use in the light source control circuitry to modulate the emitted light beam, Equation 1 is plotted as a function of time:

$$t - Tsoa = (x - xsoa)/v0 \quad \text{[Equation 3]}$$

Figure 5B:
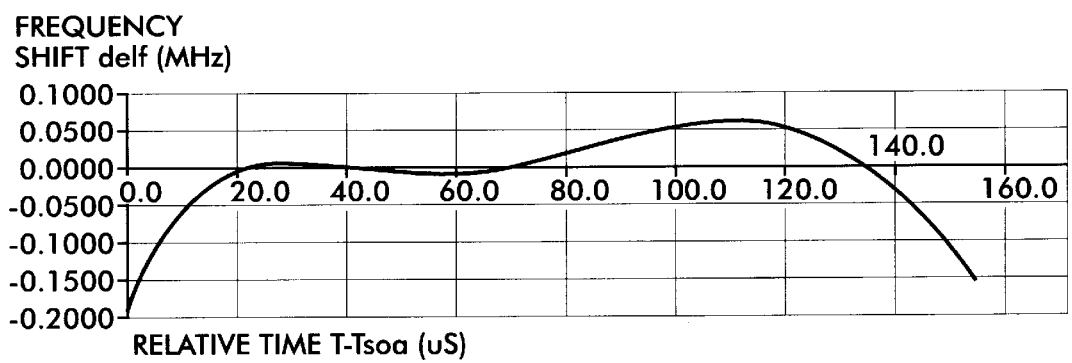
FIG. 5B is a graph illustrating correction frequency versus relative time for the first raster output scanning (ROS) System of FIG. 5A.
Figure 6B:
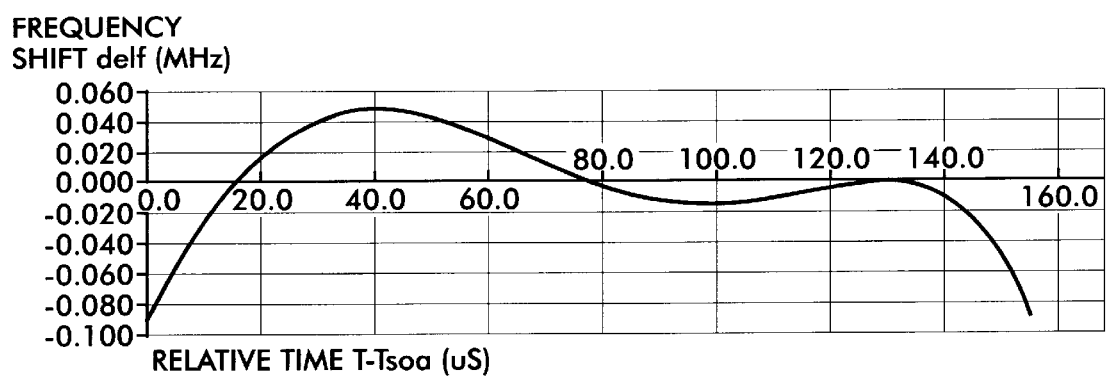
FIG. 6B is a graph illustrating correction frequency versus relative time for the second raster output scanning (ROS) system of FIG. 6A.

Equation 3 is used for the graphs (correction frequency versus relative time) in FIGS. 5B and 6B.

The rate of change of the frequency shift is:

$$d\Delta f/dt = v0 * f0 * (d^2y/d^2x) \quad \text{[Equation 4]}$$

where the third factor of $(d^2y/d^2x)$ is the second derivative of the polynomial curve fit to the measured scan non-linearity.

Figure 7:
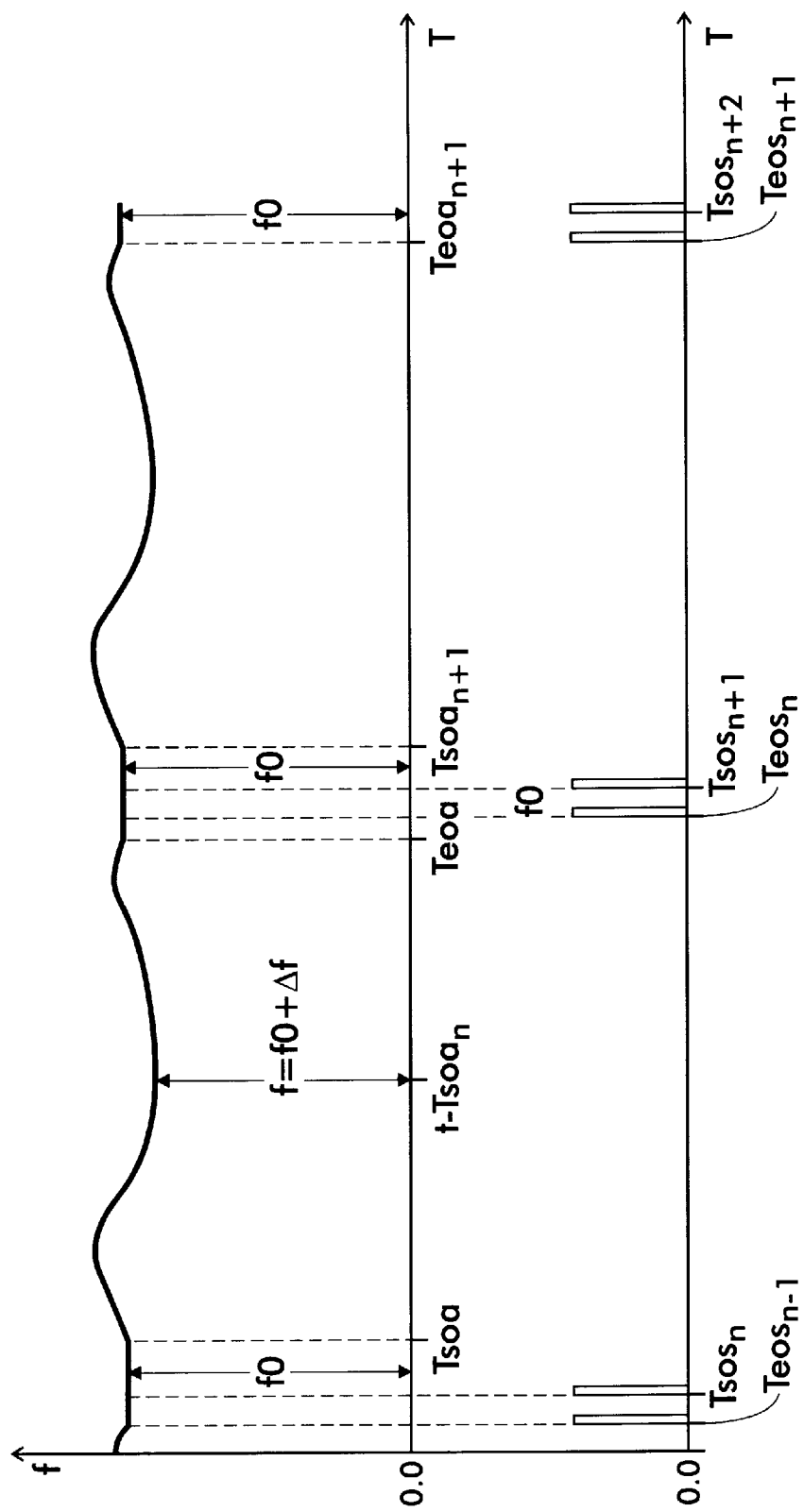
FIG. 7 is a graph illustrating the scan line non-linearity correction by shifting the pixel clock frequency of the present invention.

The pixel clock frequency $f0$ is assumed to be the nominal value $f0$ outside the active scan and to be shifted by $\Delta f$, according to Equation 1, in the active scan as shown in the graph in FIG. 7. FIG. 7 illustrates the first order scan line non-linearity correction by shifting the pixel clock frequency of the present invention.

There is a discontinuity in the slope of the frequency shift at the end points SOS and EOS in the scanline. In practice, the bandwidth of the light source control circuitry is limited by filtering which smoothes the discrete sampling of frequency change in Equation 1. This frequency change is adjusted in time increments of pixel clock period, or some multiple of pixel clock period. However, both the frequency shift $\Delta f$ and the slope of the frequency shift can be forced to zero by (a) weighting several points near the ends of the active scan or (b) using piecewise fitting of the non-linearity curve with zero slope at xsoa and xeoa as a side condition.

The present invention for calculating frequency non-linearity is extensible to the additional printer requirements of (a) offset of the starting position for the calculation table using a time offset of SOA and (b) compensation for ROS to ROS variations scan magnification by adjusting $f0$ as a parameter from its nominal value. Information for these two adjustments comes from sensors in the laser printer.

The present invention also provides a multiple iteration algorithm, which enables refinement of calculations for the non-linearity correction frequencies.

The second iteration is carried out by utilizing the frequency shifts of Equations 1 and 4 and by measuring the residual non-linearity yi of the pixel placement along the scan line and the corresponding slope $(dy/dx)i$ of the data smoothing polynomial curve. Thus, the second iteration frequency corrections are given as:

$$\Delta fi = f0 * (dyi/dx)i \quad \text{[Equation 5]}$$

Figure 8:
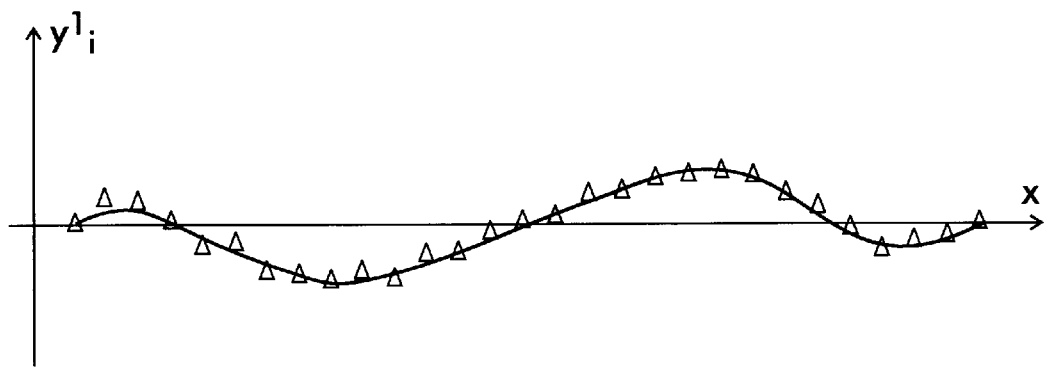
FIG. 8 is a graph illustrating the residual non-linearity yi after the first order iteration of the scan line non-linearity correction by shifting the pixel clock frequency of the present invention.

The results are illustrated in FIG. 8 which shows the residual non-linearity yi after the first order iteration.

Thus, the required clock frequencies to second order are:

$$f2i = f0 + \Delta f1i + \Delta f2i \quad \text{[Equation 6]}$$

Figure 9:
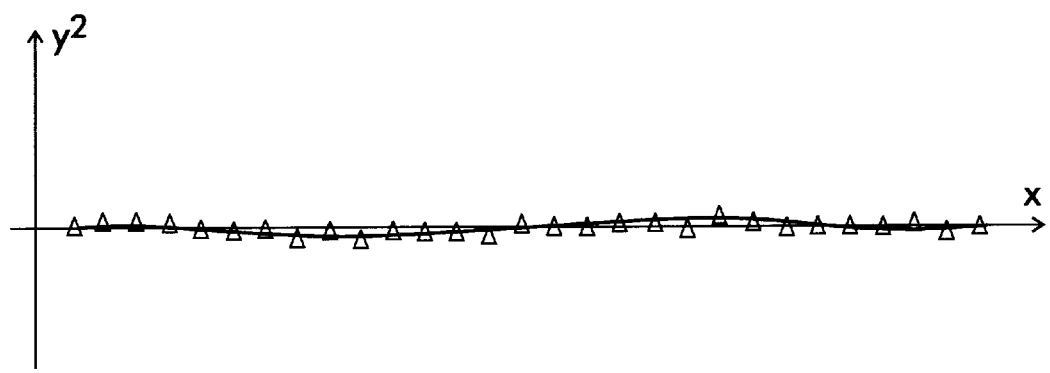
FIG. 9 is a graph illustrating the scan line non-linearity correction by shifting the pixel clock frequency after the second order iteration of the present invention.

FIG. 9 illustrates the scan line non-linearity correction by shifting the pixel clock frequency after the second order iteration of the present invention.

Likewise the iteration of the algorithm can be continued to higher orders, if needed. A measurement or simulation of the residual is completed before each iteration. The nth order iterations would be given as:

$$\Delta fni = f0 * (dy^{(n-i)}/dx)i \quad \text{[Equation 7]}$$

$$f2i = f0 + \Delta f1i + \Delta f2i + \ldots + \Delta fni \quad \text{[Equation 8]}$$

The present invention provides a method for calculating the necessary frequency shifts $\Delta f$ based on the scan line non-linearity of the ROS to modify the nominal pixel clock frequency $f0$ to provide uniformly spaced pixel placement along the scan line. The frequency shifts $\Delta f$ are calculated from the first or higher order iterations of the data smoothing polynomial curves based on the scan line non-linearity pixel placement of the ROS. The data smoothing polynomial curve forces the frequency shift $\Delta f$ of the start of scan pixel along said scan line to zero and forces the frequency shift $\Delta f$ of the end of scan pixel along said scan line to zero.

The frequency shifts $\Delta f$ are stored in a frequency shift lookup table and are used to modify the nominal pixel clock frequency $f0$ as applied to the light source control circuitry. The pixel clock and the light source control circuitry them modulate the emitted light beam of the ROS to provide pixels will then be placed with equal spacing across the scan line.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A raster output scanning system comprising
a light source for emitting a modulated light beam,
a rotating polygon mirror for reflecting said modulated light beam along a scan line on a photosensitive medium, and
a modulation circuit for modulating the light beam, said modulation circuit having a pixel clock for producing a nominal clock frequency of $f0$ to provide uniformly spaced placement of pixels along said scan line, said pixel clock having a frequency shift lookup table to provide a frequency shift $\Delta f$ to modify said nominal clock frequency $f0$ to correct for non-linearity of said pixels along said scan line, wherein said frequency shift is calculated from a data smoothing polynomial curve for the non-linear positions of said pixels along said scan line.

2. The raster output scanning system of claim 1 wherein said data smoothing polynomial curve is a first order iteration.

3. The raster output scanning system of claim 1 wherein said data smoothing polynomial curve is a second order iteration.

4. The raster output scanning system of claim 1 wherein said data smoothing polynomial curve is a nth order iteration.

5. The raster output scanning system of claim 1 wherein said data smoothing polynomial curve is calculated by as least squares regression.

6. The raster output scanning system of claim 1 wherein said data smoothing polynomial curve forces the frequency shift $\Delta f$ of the start of scan pixel along said scan line to zero and forces the frequency shift $\Delta f$ of the end of scan pixel along said scan line to zero.

* * * * *